(12) United States Patent
Okrepkie et al.

(10) Patent No.: US 7,350,554 B1
(45) Date of Patent: Apr. 1, 2008

(54) PORTABLE TIRE BEAD BREAKING APPARATUS

(76) Inventors: Joseph Okrepkie, 993 Dalton Hill Rd., Newark Valley, NY (US) 13811; Francis Bastow, 10 Greenwood Rd., Newark Valley, NY (US) 13811

( * ) Notice: Subject to any disclaimer, the term of this patent is extended or adjusted under 35 U.S.C. 154(b) by 78 days.

(21) Appl. No.: 11/509,175

(22) Filed: Aug. 24, 2006

(51) Int. Cl.
*B60C 25/125* (2006.01)
*B60C 25/13* (2006.01)

(52) U.S. Cl. .................................... 157/1.17; 157/1.2

(58) Field of Classification Search ............. 157/1.1, 157/1.17, 1.2, 1.28, 1, 14, 17
See application file for complete search history.

(56) References Cited

U.S. PATENT DOCUMENTS

| | | | |
|---|---|---|---|
| 2,319,155 A * | 5/1943 | Passanante et al. | 157/1.17 |
| 2,495,117 A * | 1/1950 | McCollister | 157/1.17 |
| 2,571,517 A * | 10/1951 | Aycock | 157/1.17 |
| 2,619,158 A * | 11/1952 | Kohn | 157/1.17 |
| 4,580,612 A * | 4/1986 | Smithkey | 157/1.2 |
| 4,676,291 A * | 6/1987 | Bolger | 157/1.17 |
| 4,756,354 A | 7/1988 | Callas | |
| 4,800,943 A * | 1/1989 | Umemoto et al. | 157/1.17 |
| 4,969,498 A | 11/1990 | Sheets | |
| 5,009,257 A | 4/1991 | Reeves | |
| 5,191,934 A * | 3/1993 | Wicklund | 157/1.17 |
| 5,555,922 A | 9/1996 | Brunner | |
| 6,145,566 A | 11/2000 | Kilskey | |
| 6,273,171 B1 | 8/2001 | Kilskey | |
| 6,786,267 B1 * | 9/2004 | Warren | 157/1.2 |
| 6,932,137 B1 * | 8/2005 | Curtis | 157/1.17 |

* cited by examiner

*Primary Examiner*—David B Thomas
(74) *Attorney, Agent, or Firm*—Mark Levy & Associates, PLLC

(57) ABSTRACT

A portable bead breaking apparatus useful for breaking the bead of an ATV-type, low-pressure, balloon tire away from a safety rim upon which the tire is mounted. The apparatus applies carefully directed downward and inward pressure at opposing sides of the tire bead. By applying pressure in this manner against the bead, the bead is broken without injury to the tire and the tire may then be removed from the rim. The apparatus is portable and collapsible into a convenient storage pouch so that an ATV operator may readily carry the device with him or herself when operating the vehicle in regions remote from a tire service facility. Using the apparatus, an operator may readily remove a tire and repair damage thereto. The tire may then be remounted and reinflated.

14 Claims, 5 Drawing Sheets

PORTABLE TIRE BEAD BREAKING APPARATUS

FIELD OF THE INVENTION

The present invention pertains to bead breaking devices for tires and, more particularly to a portable apparatus for disengaging an ATV tire from a wheel rim having a safety rib.

BACKGROUND OF THE INVENTION

Maintaining inflatable tires on wheel rims while permitting the tire to be readily removed from the rim for repair or replacement has presented many problems over the years. To properly maintain a tire in place on the wheel during use, a bead bundle is provided in the rim-engaging portion of the tire. This bead bundle enhances the tire's rim gripping capacity and helps maintain the tire on the rim. The rim-engaging portion of the tire with the bead bundle is generally known in the art as the tire bead. In an unstressed condition, the inner diameter of the tire bead is smaller than the diameter of the rim on which it resides.

The small clearance between the tire and the rim makes removing tires from their rims difficult. A variety of hand tools such as slide bars, hammers, chisel-like tools, and jackscrews have been used to disengage the tire bead from the rim of a wheel. These techniques typically require great strength and dexterity on the part of the operator. Furthermore, these hand tool techniques can cause damage to the tire and rim.

The process of disengaging the tire from the rim of a wheel is frequently referred to as "bead breaking". After the tire bead is broken, the tire may then be stripped from the rim of the wheel. Many of today's tires and, in particular, the All Terrain Vehicle's (ATVs) tire designs have further complicated the task of bead breaking. Because ATVs are designed for off-road driving over rough, slippery and even soft, muddy surfaces, the tires upon which they ride are typically wide, soft, and balloon-like.

These tires operate at low inflation pressures, typically approximately 3-5 psi because the rough terrain typically traversed by an ATV when driven aggressively can unintentionally break the tire bead, generally because of side loads imposed upon the tire. To solve the problem, safety rims were developed having an additional annular safety rib offset from the rim to provide additional support for the tire bead. These safety ribs effectively prevent the tire beads from breaking away from the rim, particularly when the tire is subjected to a side load. While the use of such safety rims has largely eliminated bead breaking problems with ATV tires, it has led to a new problem.

Intentionally breaking the bead of a tire mounted to a safety rim is difficult. The balloon-like profile of the tires used on ATVs makes it difficult to insert a tool between the rim and the tire. The bead does not readily yield to simple inward pressure, which is otherwise sufficient to break the bead of a tire on a non-safety rim. Even conventional "tire-changing" machines disposed in garages, tire store, etc. are not readily usable to break the bead of a typical ATV tire. This is in part because such machines are designed to deal with tire sizes found on passenger vehicles and small trucks.

Because, as their name implies, ATVs are typically operated far from a road, often traveling cross-country over rugged terrain, a flat tire is highly problematic. Many ATV operators can recite tales of long walks out of the woods carrying a vehicle rim bearing a flat tire.

DISCUSSION OF THE RELATED ART

A variety of bead breaking devices has been developed to cope with the problems of bead breaking and, in particular, for bead breaking of ATV tires. For example, U.S. Pat. No. 4,756,354 for APPARATUS FOR COLLAPSING THE BEADS OF ALL-TERRAIN VEHICLE TIRES, issued Jul. 12, 1988 to Frank J. Callas teaches an adjustable width device for exerting downward pressure on the ATV tire to break the bead from the rim.

U.S. Pat. No. 4,969,498 for TIRE BEAD BREAKER, issued Nov. 13, 1990 to John W. Sheets teaches another bead breaking device incorporating a hydraulic jack to increase available pressure on the tire bead to facilitate its separation from the rim.

U.S. Pat. No. 5,009,257 for TIRE BREAKER APPARATUS FOR ALL-TERRAIN VEHICLES, issued Apr. 23, 1992 to Richard R. Reeves discloses a tool having a support base for receiving an ATV wheel, a linkage-supporting upright post, and pair of operators. A first operator activates a sidewall clamping device while a second operator actuates a bead press shoe. The sidewall clamping device ensures deflation of the ATV tire when downward pressure is brought to bear on the bead press shoe.

U.S. Pat. No. 5,555,922 for TIRE BEAD BREAKING TOOL, issued Sep. 17, 1996 to Larry F. Brunner provides an attachment to a tire stripping stand or bench wherein, after a preliminary width adjustment, individual screws may be tightened to exert inward pressure against the tire bead.

U.S. Pat. No. 6,145,566 for CENTER POST TIRE CHANGING APPARATUS, issued Nov. 14, 2000 to Roger Kilskey shows a traditional, lever-actuated tire bead breaker.

U.S. Pat. No. 6,273,171 for BEAD BREAKING DEVICE, AND METHOD FOR USING SAME, issued Aug. 14, 2001 to Roger Kilskey teaches a bead breaking apparatus wherein a lever arm providing downward force against the tire bead is rotated around the center post to break the tire bead away from the rim.

None of the forgoing patents, individually, or in any combination, is seen to teach or suggest the novel bead breaker apparatus of the invention.

SUMMARY OF THE INVENTION

In accordance with the present invention there is provided a portable bead breaking apparatus useful for breaking the bead of an ATV-type, low-pressure, balloon tire away from a safety rim upon which the tire is mounted. Safety rims have an additional annular safety rib offset from the rim to provide additional support for the tire bead. While such safety ribs effectively prevent the tire beads from breaking away from the rim, particularly when the tire is subjected to a side load, they make intentionally removing the tire from the rim for service or replacement notoriously difficult.

The apparatus of the present invention, however, overcomes this difficulty by applying carefully directed downward and inward pressure at opposing sides of the tire bead. By applying pressure in this manner against the bead, the bead is broken without injury to the tire and the tire may then be removed from the rim. The apparatus is portable and collapsible into a convenient storage pouch so that an ATV operator may readily carry the device with him or her when operating the vehicle in regions remote from a tire service facility. Using the inventive apparatus, the operator may readily remove the tire and repair damage thereto. The tire may then be remounted and reinflated.

It is, therefore, an object of the invention to provide a tire bead breaking apparatus that facilitates removing a tire from a safety rim.

It is another object of the invention to provide a tire bead breaking apparatus readily usable with low-pressure, balloon tires commonly used on ATVs.

It is a further object of the invention to provide a tire bead breaking apparatus that is compact and readily stowable on or in an ATV for use in the field.

It is yet another object of the invention to provide a tire bead breaking apparatus that effectively breaks the tire bead without damaging the tire or the rim.

It is a still further object of the invention to provide a tire bead breaking apparatus that is adapted for use with a wide variety of ATV wheel sizes and styles.

It is an additional object of the invention to provide a tire bead breaking apparatus that may readily be used by a single person.

It is another object of the invention to provide a tire bead breaking apparatus that is operable by a person of modest strength.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE PREFERRED EMBODIMENT

The present invention features a portable bead breaking apparatus particularly useful for breaking the bead of low inflation pressure tires mounted on safety rims.

Figure 1:
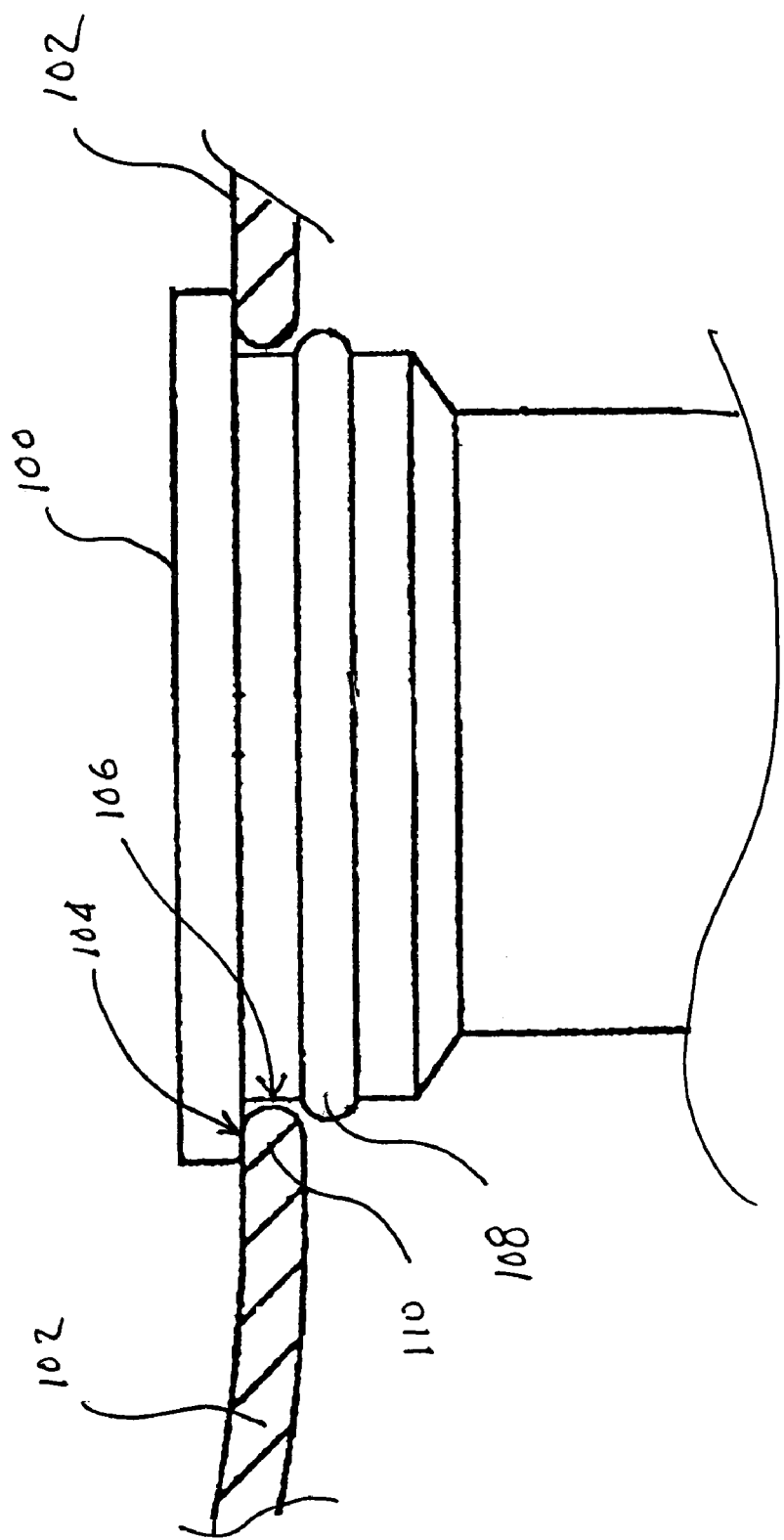
FIG. 1 is a cross-sectional view of a safety rim.

Referring first to FIG. 1, there is shown a cross-sectional view of an upper portion of a safety rim 100. A bead portion 110 of a tire 102 is shown seated in a bead seat 106 formed between sealing surface 104 of rim 100 and an upper surface of safety rib 108. Such a safety rim arrangement works well in helping maintain a bead seal between bead 110 of tire 102 and sealing surface 104, thereby maintaining tire pressure within tire 102, even when tire 102 is subjected to both axial and radial loading. A combination of axial and radial loading is common on ATV tires, especially when the vehicle is driven aggressively over rough terrain. Without safety rib 108, tire 102 could easily deflate when subjected to a side load, for example, if the vehicle, not shown, tips sideways.

The problem that arises with safety rim 100 is not typically during vehicle use. Rather, the problem occurs when the bead seal between bead 110 and sealing surface 104 is to be intentionally broken. On tires mounted on conventional rims (i.e., rims without safety rib 108), simple inward pressure on the tire 102 proximate the bead is typically sufficient to break the bead seal. The tire bead is merely pushed away from sealing surface 104. On safety rim 100, however, safety rib 108 prevents this motion.

Figure 2:
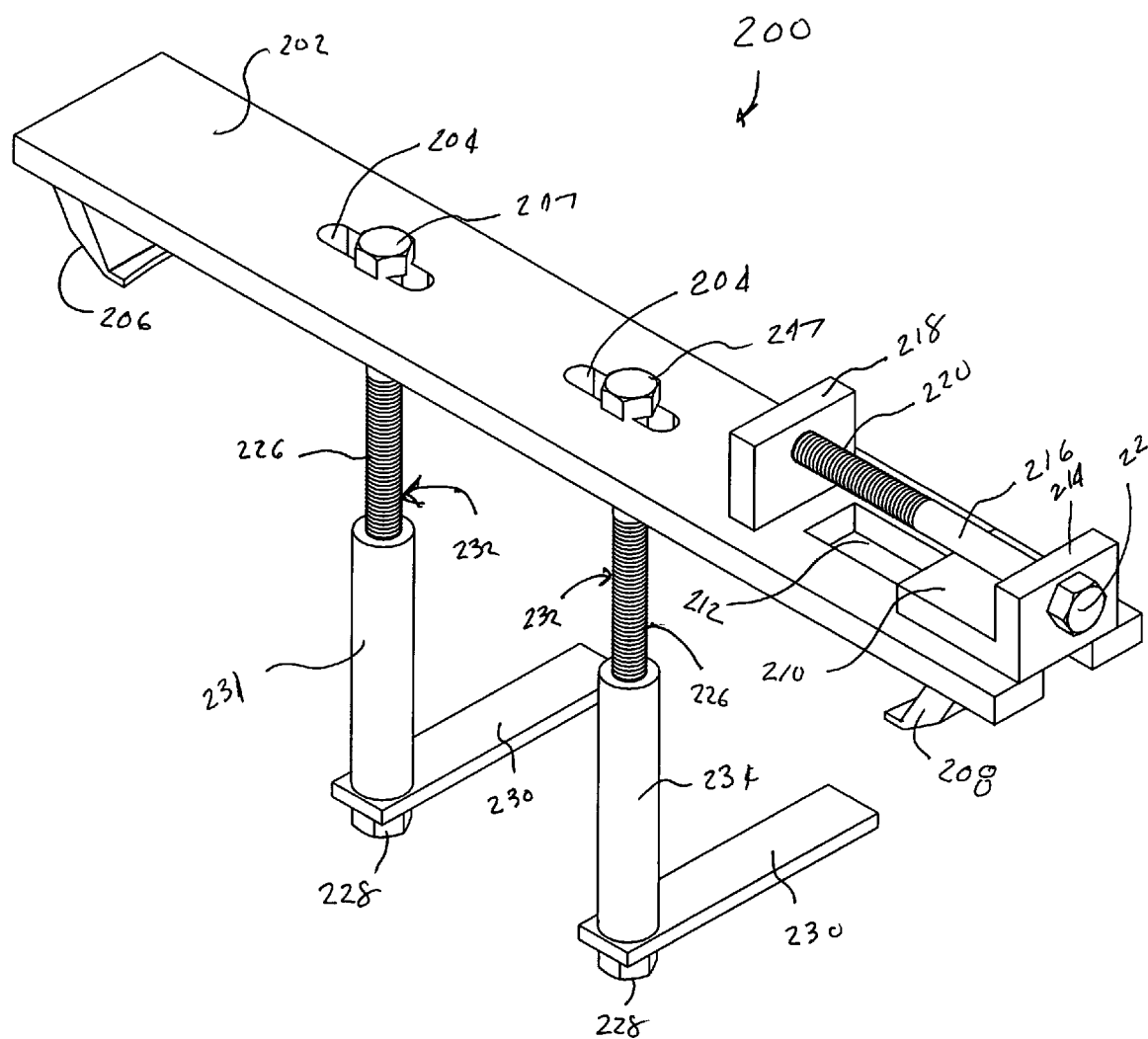
FIG. 2 is a perspective view of the bead breaking apparatus of the invention.
Figure 3:
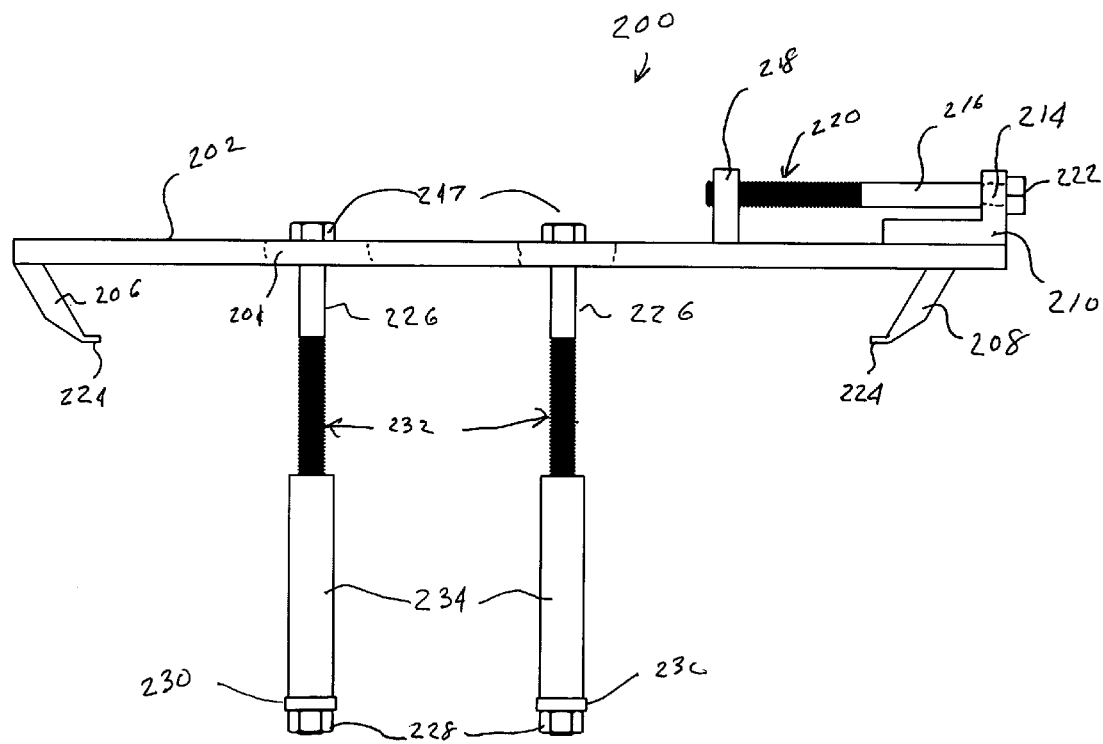
FIG. 3 is a side, elevational view of the bead breaking apparatus of FIG. 2.

Referring now to FIGS. 2 and 3, there are shown perspective and side, elevational views, respectively, of a bead breaking apparatus of the invention, generally at reference number 200. Bead breaker 200 is specifically designed to solve the aforementioned problem of bead breaking tires mounted on safety rims.

A thin bar 202 has a pair of elongated slots 204 disposed in a central region thereof. A first, fixed jaw 206 is rigidly affixed, preferably by welding, crimped, riveted, bolted or with mechanical fasteners, to a lower surface of bar 202 at a distal end thereof. Bar 202 is an elongated rectilinear bar in FIG. 2, but it should be understood that any longitudinal shape can also be used.

A second, movable jaw 208 is rigidly affixed to a lower surface of movable block 210. Movable block 210 is adapted to slide in a slot 212 formed in a proximal end of bar 202. An upwardly-projecting portion of movable block 210 has a through hole 214 aligned substantially parallel to a major axis of both bar 202 and slot 212. Through hole 214 is sized to accommodate the shaft of bolt 216 passed therethrough.

An upstanding member 218, rigidly affixed to an upper surface of bar 202 proximate a terminus of slot 212, has internal threads, not shown, sized and adapted to threadably receive a threaded portion 220 of bolt 216. Bolt 216 has a hex head 222 adapted for interaction with a lug wrench, not shown, normally used to loosen lug nuts with which a rim is mounted to the wheel of the vehicle. It will be recognized that bolt head 222 may have other configurations and or sizes than the hex geometry configuration chosen for purposes of disclosure. Consequently, the invention covers any and all suitable bolt head geometries and sizes.

Both fixed jaw 206 and movable jaw 208 have tip portions 224 adapted for interaction with the tire bead 110 (FIG. 1) proximate the bead sealing surface 108.

A bolt 226 having a head 247 is accommodated in each of slots 204. A nut 228 adapted for threadable interaction with threads 232 of bolts 226 is rigidly affixed to anti-rotation bar 230. A spacer sleeve 234 is slidably accommodated on the shaft of each of bolts 226, so that different lengths can be created to accommodate different bolt lengths and/or wheel hub dimensions.

Figure 4:
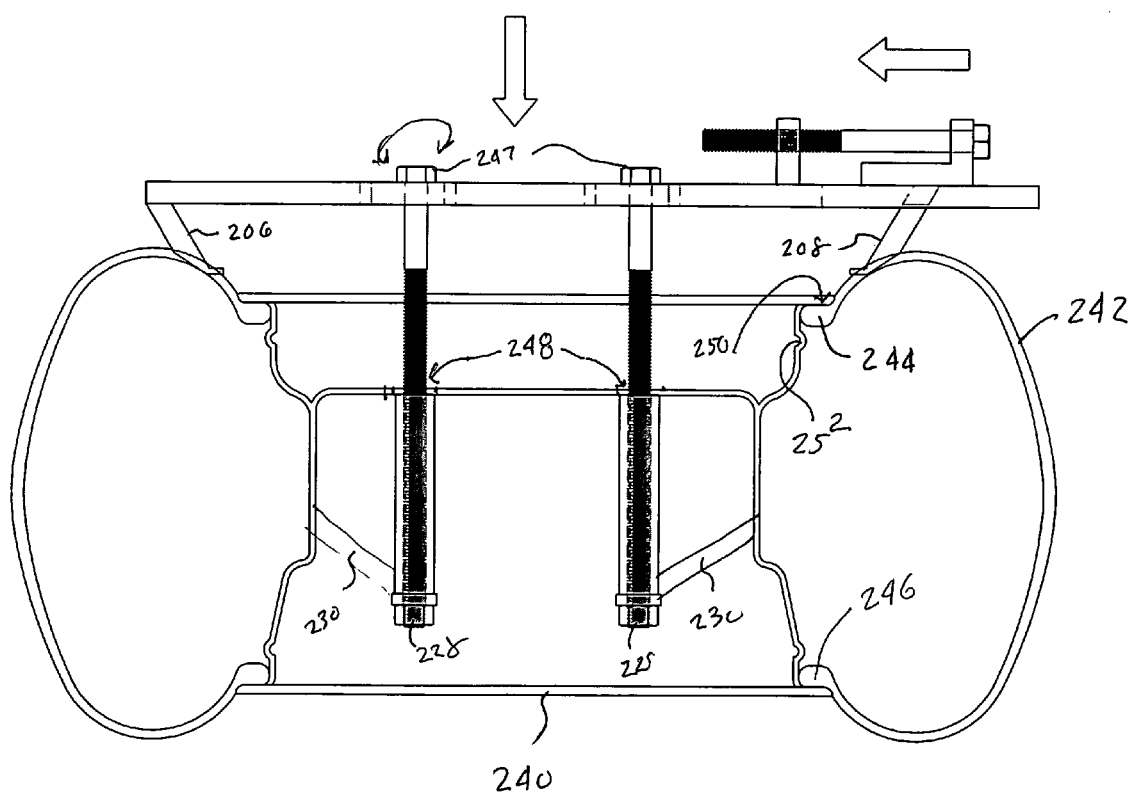
FIG. 4 is a side, elevational view of the bead breaking apparatus of FIG. 2 in its intended operating environment in a first, unactuated position.

Referring now also to FIG. 4, there is shown a side, elevational, cross-sectional view of bead breaking apparatus 200 in place on a rim 240 upon which is mounted a tire 242 having an upper bead region 244 and a lower bead region 246.

Bolts 226 pass through mounting holes 248 in rim 240. Slots 204 are sized and configured to accommodate all known ATV rim mounting bolt spacings.

Because rim 240 is asymmetrical top-to-bottom as viewed in FIG. 4, spacer sleeves 234 may or may not be required, depending upon whether a top tire bead 244 or bottom tire bead 248 is being broken. As shown in FIG. 4, bead breaking apparatus 200 is positioned to break top bead 244.

Bead breaking apparatus 200 is shown positioned so that tip portions 224 are positioned as desired against the sidewall of tire 242 proximate bead 244 prior to breaking the bead.

In operation, nuts 228 and affixed anti-rotation bars 230 are removed, if necessary, from bolts 226. Bolts 226 are then slid in elongated slots 204 to align with mounting holes 248 in rim 240 and are passed therethrough.

After bolts 226 are passed through holes 248 of rim, nuts 228 affixed to anti-rotation bars 230 are threaded onto bolts 226. Anti-rotation bars 230 rotate until encountering an inner surface of rim 240, which prevents their further rotation. Bolts 226 may then be tightened to by applying torque to heads 247 of bolts 226 until the desired vertical relationship is established between bead breaking apparatus 200 and tire 240 mounted on rim 240.

Concurrently, bolt 216 is loosened or tightened as appropriate so as to properly position movable jaw 208 relative to fixed jaw 206. Once fixed jaw 206 and movable jaw 208 are properly positioned, suitable tightening bolts 226 and 216 gradually push bead 244 away from sealing surface 250 and over safety ridge 252 of rim 240.

Figure 5:
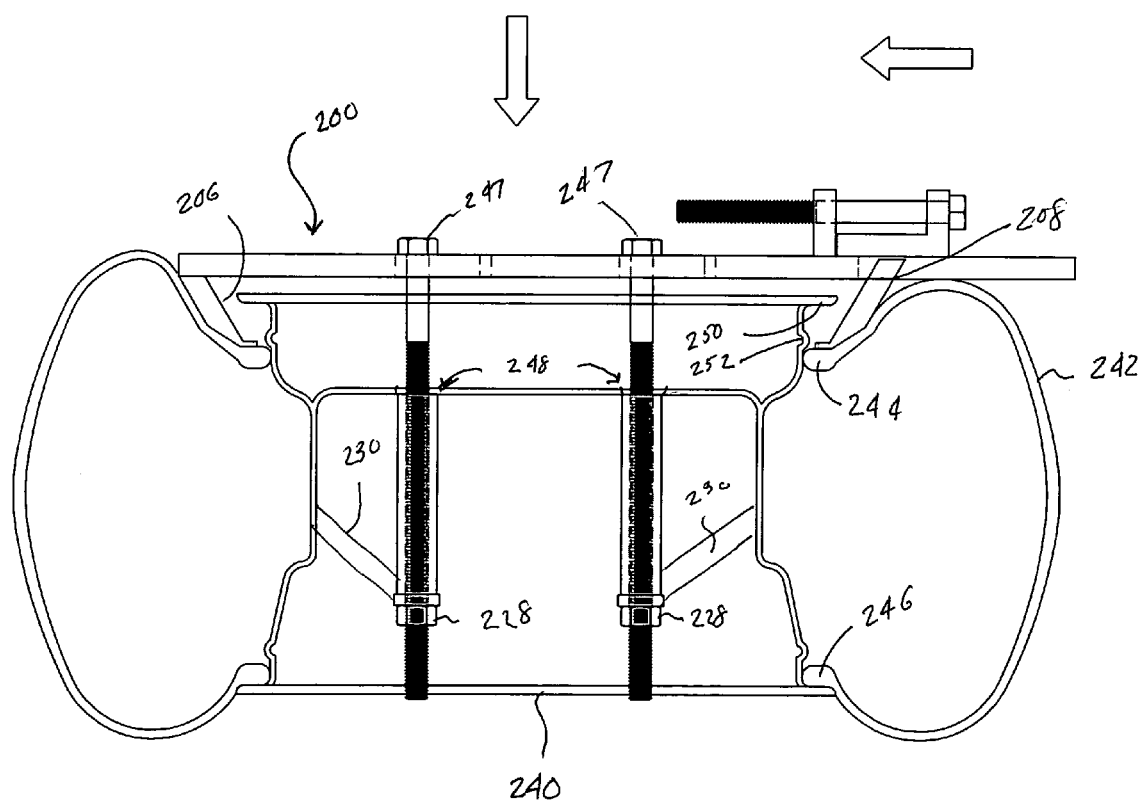
FIG. 5 is a side, elevational view of the bead breaking apparatus of FIG. 2 in its intended operating environment in a second, actuated position.

Referring now also to FIG. 5, there is shown another side, elevational, cross-sectional view of bead breaking apparatus 200 similar to FIG. 4. However, FIG. 5, shows positions of bead breaking apparatus 200 after bead 244 is separated from sealing surface 250. Note, however, that lower bead remains in place, not yet having been broken.

Once top bead 244 is broken, bead breaking apparatus 200 is removed from rim 240. Rim 240 bearing tire 242 is then turned over and bead breaking apparatus 200 reattached to break lower bead 246 in a similar manner to that described hereinabove.

Once upper bead 244 and lower bead 246 are broken, tire 242 may readily be removed from rim 240 using techniques well known to those of skill in the art. A puncture or other tire damage may be repaired and tire 242 then remounted to rim 240 and reinflated.

After use, bolts 226 may be removed and stored with bar 202 in a suitable container. The slim form factor so obtained makes storage of bead breaking apparatus 200 easy to transport in a storage compartment of an ATV, not shown.

Since other modifications and changes varied to fit particular operating requirements and environments will be apparent to those skilled in the art, this invention is not considered limited to the example chosen for purposes of this disclosure, and covers all changes and modifications which do not constitute departures from the true spirit and scope of this invention.

Having thus described the invention, what is desired to be protected by Letters Patent is presented in the subsequently appended claims.

What is claimed is:

1. A portable apparatus for breaking the bead of a tire mounted on a safety rim, comprising:
    a) a longitudinal member having a proximal and a distal end;
    b) a fixed jaw rigidly attached to said longitudinal member proximate said distal end thereof;
    c) a movable jaw movably affixed to said longitudinal member proximate said proximal end thereof and manually movable along a major axis thereof;
    d) means for mounting said longitudinal member to a safety rim having a tire mounted thereupon; and
    e) means for applying both a downward and an inward motion to said jaws;
whereby a tire bead proximate said at least one of said movable and said fixed jaws is separated from a sealing surface of said rim.

2. The portable apparatus for breaking the bead of a tire mounted on a safety rim as recited in claim 1, wherein said longitudinal member comprises a rectilinear bar.

3. The portable apparatus for breaking the bead of a tire mounted on a safety rim as recited in claim 2, wherein said fixed jaw is welded to said rectilinear bar.

4. The portable apparatus for breaking the bead of a tire mounted on a safety rim as recited in claim 1, wherein said movable jaw comprises a movable block adapted to move within a slot proximate a proximal end of said rectilinear bar.

5. The portable apparatus for breaking the bead of a tire mounted on a safety rim as recited in claim 4, wherein said movable jaw further comprises a manually operated threaded device adapted for interaction with threads of a captive member affixed to said rectilinear bar so that rotation of said threaded device moves said movable jaw along said major axis.

6. The portable apparatus for breaking the bead of a tire mounted on a safety rim as recited in claim 5, wherein said means for applying an inward motion to said jaws comprises said threaded device interacting with said captive member threads.

7. The portable apparatus for breaking the bead of a tire mounted on a safety rim as recited in claim 1, wherein said means for mounting said longitudinal member to a safety rim comprises a bolt.

8. The portable apparatus for breaking the bead of a tire mounted on a safety rim as recited in claim 7, wherein said bolt comprises at least two bolts arranged to match a predetermined mounting hole pattern in said rim.

9. The portable apparatus for breaking the bead of a tire mounted on a safety rim as recited in claim 8, wherein said bolt comprises a thread portion disposed on a distal portion thereof and wherein said means for mounting said longitudinal member to a safety rim further comprises a nut adapted for threaded interaction with said threaded portion of said bolt, said nut being rigidly affixed to an anti-rotation bar.

10. The portable apparatus for breaking the bead of a tire mounted on a safety rim as recited in claim 9, wherein said means for applying a downward motion to said jaws comprises said bolts interacting with said nuts.

11. The portable apparatus for breaking the bead of a tire mounted on a safety rim as recited in claim 9, wherein said meant for mounting said longitudinal member to a safety rim further comprises at least one spacer disposed at the proximal portion of said bolt.

12. A method of removing an ATV tire from a safety rim, the steps comprising:
    a) providing a portable bead breaking apparatus adapted for breaking the bead on an ATV tire, comprising: a longitudinal member having a proximal and a distal end; a fixed jaw rigidly attached to said longitudinal member proximate said distal end thereof; a movable jaw movably affixed to said longitudinal member proximate said proximal end thereof and manually movable along a major axis thereof; means for mounting said longitudinal member to a safety rim having a tire mounted thereupon; and means for applying both a downward and an inward motion to said jaws;
    b) mounting said portable bead breaking apparatus to a first side of said ATV tire mounted on said safety rim;
    c) operating said portable bead breaking apparatus to break a bead of said ATV tire from said first side of said safety rim; and
    d) repeating said mounting step (b) and said operating step (c) for a second side of said ATV tire.

13. The method of removing an ATV tire from a safety rim as recited in claim 12, wherein said mounting step (b) comprises using bolts to mount said portable bead breaking apparatus to said rim.

14. The method of removing an ATV tire from a safety rim as recited in claim 13, wherein said mounting step (b) further comprises using spacers in cooperation with said bolts to mount said bead breaking apparatus to said rim.

* * * * *